W. JOHNSTON.
MOTOR STARTING DEVICE.
APPLICATION FILED JUNE 18, 1912. RENEWED OCT. 2, 1914.
1,138,116.
Patented May 4, 1915.
2 SHEETS—SHEET 1.
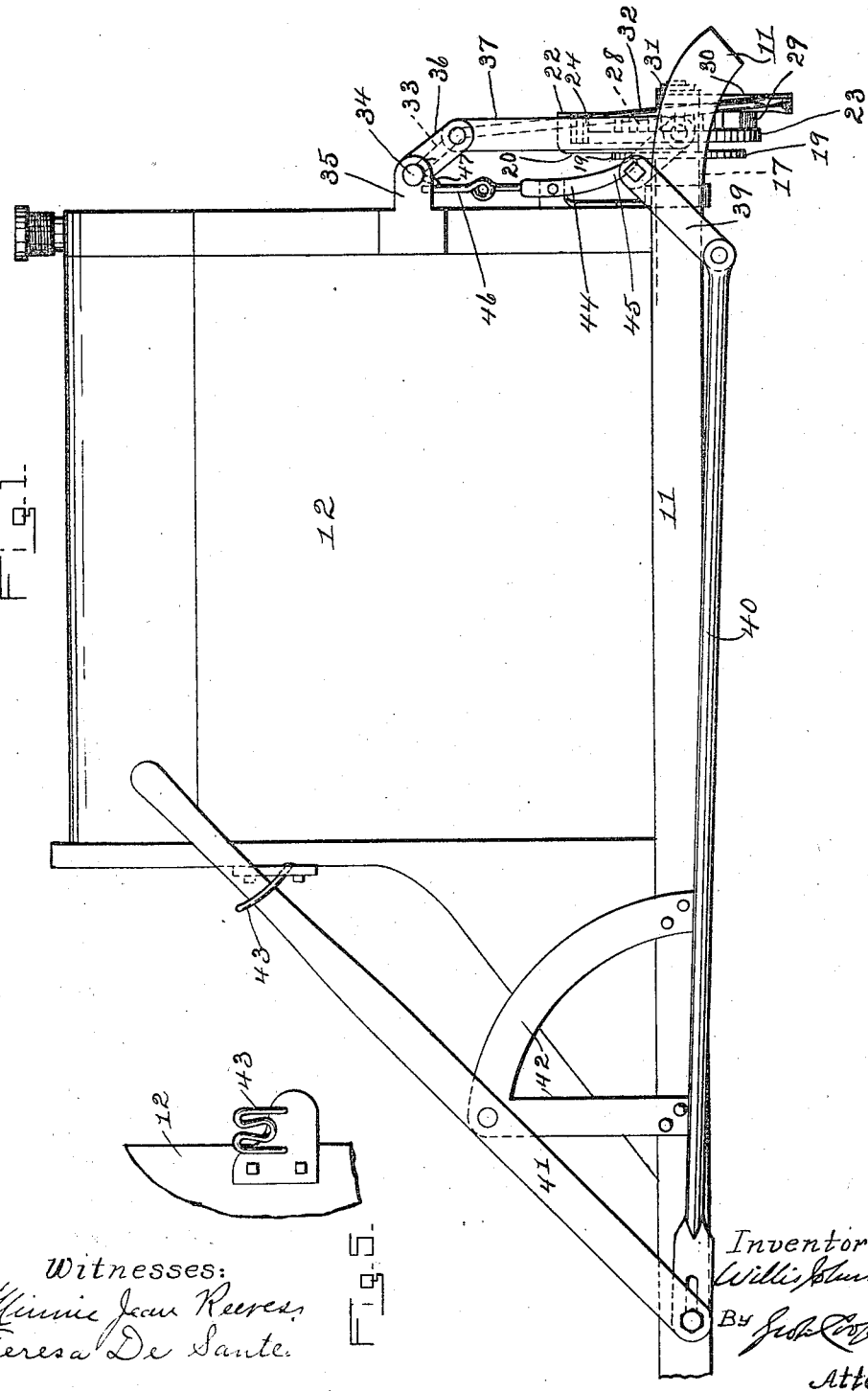

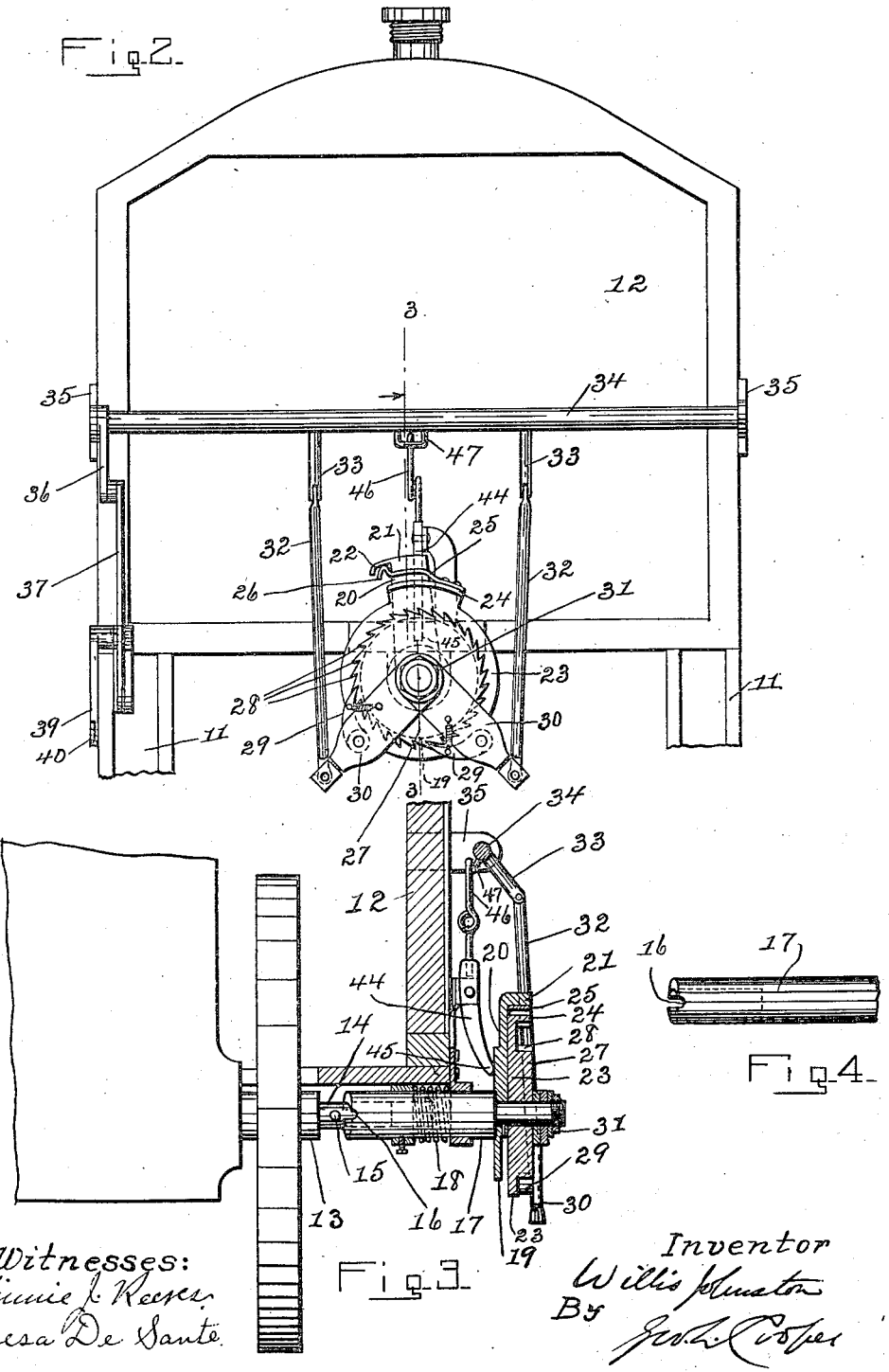

UNITED STATES PATENT OFFICE.

WILLIS JOHNSTON, OF SCHENECTADY, NEW YORK.

MOTOR-STARTING DEVICE.

1,138,116.        Specification of Letters Patent.        Patented May 4, 1915.

Application filed June 18, 1912, Serial No. 704,275. Renewed October 2, 1914. Serial No. 864,702.

*To all whom it may concern:*

Be it known that I, WILLIS JOHNSTON, a citizen of the United States, residing at Schenectady, Schenectady county, New York, have invented certain new and useful Improvements in Motor-Starting Devices, of which the following is a specification.

My invention relates to means for starting or "cranking up" gasolene or like motors of the rotary type usually used in automobiles, launches or other vehicles, and for other purposes. In motor cars, *e. g.*, the motor is usually started by turning a crank connected to the forward end of the crank-shaft, which is extended through the forward end of the crank-case for that purpose. With the ordinary connection this method is both inconvenient and dangerous, a back-fire being likely to strain or break the operator's arm.

The object of my invention is to provide simple, durable, efficient and safe means for starting a motor without danger of accident and, in a motor car, without requiring a chauffeur to leave his seat. Further objects of the invention and advantageous means for effecting the same will appear in this specification and be pointed out in the claims.

In the drawings, Figure 1 is a partial side view of a motor car provided with a preferred form of my device; Fig. 2 is a front view of the same; Fig. 3 is a vertical section through the plane 3—3, Fig. 2; Figs. 4 and 5 show details.

11 designates a part of the frame of the car; 12, a hood or bonnet; 13, a crank-shaft; all of usual or desired construction. The forward end 14 of shaft 13 is shown as reduced in diameter and provided with a transverse, protruding pin 15, the ends of which engage in notches 16 at the end of a sleeve 17 adapted to longitudinal movement on shaft end 14 and forced rearwardly by a spring 18 into engagement with pin 15. On the forward end of sleeve 17 is secured a disk 19 having a radial arm 20 formed with a forwardly projecting lug 21 provided with a recess 22. Rotatably mounted on sleeve 17 in front of arm 20 is a disk 23 having a radial lug 24, to which is secured a spring 25 formed with a bent end 26 adapted to engage in recess 22 in lug 21. Disk 23 has a forwardly extending part 27 provided with circumferential teeth 28. With these ratchet teeth 28 engage, in the present instance, two spring engaged pawls 29, each mounted on a radial arm 30, pivoted on sleeve 17 and held in place by nuts 31. Each arm 30 is connected by a link 32 to an arm 33 on a transverse rock-shaft 34 mounted in bearings 35 at the front of the machine. At one end of shaft 34 is a rigid arm 36, connected by link 37 to a bell-crank 39, linked by rod 40 to the lower end of hand lever 41, which is pivoted on bracket 42 on frame 11. At the rear of crank-case 12 is a spring clip 43, which serves to hold lever 41 against accidental displacement. On the front of the machine is pivoted a lever 44, the toe 45 of which bears against disk 19 and the resilient upper end 46 of which is in the path of rotation of a lug 47 on rock-shaft 34.

The operation of the starting device is as follows: The first movement of hand lever 41 releases it from clip 43 and at the same time raises arm 36, rocking shaft 34 sufficiently to relieve the pressure of lug 47 against lever 44, the toe 45 of which yields to permit spring 18 to force sleeve 17 rearwardly, thus engaging its notches 16 with pin 15 on crank-shaft 13. The chauffeur then oscillates lever 41, thus rocking shaft 34 to such an extent as to cause pawls 29 to rotate disk 23 clockwise. This rotation is communicated through spring 25 and arm 20 to sleeve 17, now engaged with crank-shaft 13, and starts the motor. The chauffeur then forces hand lever 41 forward to its locked position, as in Fig. 1, the final movement of the lever acting through lug 47 to tilt lever 44 so that its toe 45 bears against disk 19, thus disengaging sleeve 17 from crank-shaft 13, see Fig. 3. Until lever 41 is so locked, teeth 28 simply "click" pawls 29.

Fig. 3 shows arms 33 and pawl arms 30 in substantially their lowermost position. It will be seen that on their up stroke the pawl at the left of the figure will act to turn disk 23, the right pawl meantime "clicking" up to its engaging position; this action being reversed on the down stroke. This insures a constant rotation of the crank-shaft. It also insures the safety of the chauffeur by preventing any communication of adverse movement from the motor to the hand lever 41. Disk 23 cannot be turned in an anti-clockwise direction for the reason that the left pawl (Fig. 2) would thereby be forced downward, while the right pawl was forced upward, thus bringing equal and opposite strains on arms 33, both rigid on shaft 34. If, therefore, a "back-fire" occurs, forcing sleeve 17 and arm 20 into reverse—anti-clockwise—rotation, spring 25 yields so that its bent end 26 slips out of recess 22 while disk 23 and parts 29 to 41 remain stationary. Obviously, the next manual rotation of disk 23, by means of hand lever 41 and its connecting parts, will reëngage spring 25 in recess 22.

I have shown the part of the engine rotor to which my starting device is connected as the crank-shaft, and the rotary connecting part as a "sleeve" having pin and notch clutch connection with such shaft, but it is evident that in these and other details of construction considerable variations may be made without departing from my invention. By the word "manual", as applied to the movement of lever 41 or its equivalent, I include pedal or mechanical movement, so that it is volitionally produced.

My present device is in certain respects similar to that shown in my pending application No. 644,489, filed August 17, 1911. It is obvious that I do not here claim anything claimed therein.

What I claim is:

1. A motor starting device including a motor crank-shaft; a rotary connecting part automatically engaged with said motor crank-shaft; an actuating rotary part disengageably connected with said connecting part; manual means for rotating said actuating part in one direction; and for preventing rotation of said actuating part in the opposite direction; and manually actuated means for disengaging said connecting part from such crank-shaft.

2. A motor starting device including a motor crank-shaft; a rotary connecting part automatically engaged with said motor crank-shaft; an actuating rotary part having disengageable spring connection with said connecting part; means for rotating said actuating part in one direction and for preventing its rotation in the opposite direction; and manually actuated means for disengaging said connecting part from such crank-shaft.

3. In a motor vehicle, a crank-shaft provided with a clutch member; a rotary connecting part also provided with a clutch member; a spring for holding said clutch members in engagement; a lever for disengaging said clutch members; a toothed disk disengageably connected with said connecting parts; two pawls constructed and fitted for alternate engagement with said disk; a rocking lever located for convenient operation by a driver seated in the vehicle and connected to said pawls to rotate said disk and to said disengaging lever to release it and thereby permit said spring to engage said clutch members.

4. In a motor vehicle, a crank-shaft provided with a clutch member; a rotary connecting part also provided with a clutch member; means for engaging and disengaging said clutch members; a toothed disk disengageably connected with said connecting part; two pawls constructed and fitted for alternate engagement with said disk; a transverse rock-shaft connected to said pawls to rotate said disk and to said clutch engaging means to operate the same; and a rocking lever located for convenient operation by a driver seated in the vehicle and operatively connected to said rock-shaft.

WILLIS JOHNSTON.

Witnesses:
GEO. L. COOPER,
MINNIE J. REEVES.